United States Patent
Deivasigamani et al.

(10) Patent No.: US 12,523,389 B2
(45) Date of Patent: Jan. 13, 2026

(54) HEATING SYSTEM WITH FIRST AND SECOND HEATING DEVICES AND BYPASS LINE

(71) Applicant: Intellihot, Inc., Galesburg, IL (US)

(72) Inventors: Sridhar Deivasigamani, Mundelein, IL (US); Sivaprasad Akasam, Round Rock, TX (US)

(73) Assignee: Intellihot, Inc., Galesburg, IL (US)

( * ) Notice: Subject to any disclaimer, the term of this patent is extended or adjusted under 35 U.S.C. 154(b) by 202 days.

(21) Appl. No.: 18/405,905

(22) Filed: Jan. 5, 2024

(65) Prior Publication Data

US 2025/0224132 A1 Jul. 10, 2025

Related U.S. Application Data

(63) Continuation-in-part of application No. 16/720,189, filed on Dec. 19, 2019, now abandoned.

(51) Int. Cl.
*F24F 11/83* (2018.01)
*F24D 11/02* (2006.01)
(Continued)

(52) U.S. Cl.
CPC .......... *F24F 11/83* (2018.01); *F24D 11/0214* (2013.01); *F24F 5/0017* (2013.01);
(Continued)

(58) Field of Classification Search
CPC .. F24F 5/0021; F24F 2221/183; F24F 11/002; F24F 11/02; F24F 11/0214; F24F 17/0036
See application file for complete search history.

(56) References Cited

U.S. PATENT DOCUMENTS

2008/0092875 A1* 4/2008 Leifer .................. F28D 20/021
126/400
2014/0230477 A1* 8/2014 Furui ....................... F24D 5/02
62/434
(Continued)

FOREIGN PATENT DOCUMENTS

EP            1614980 A2 *  1/2006  ............. F25B 13/00

OTHER PUBLICATIONS

Latent Heat definition: Merriam-Webster Online Dictionary. Retreived from: https://www.merriam-webster.com/dictionary/latent%20heat on Sep. 10, 2025.*

*Primary Examiner* — Jerry-Daryl Fletcher
*Assistant Examiner* — Daniel C Comings
(74) *Attorney, Agent, or Firm* — Jong Patent Firm; Cheng Ning Jong; Tracy P. Jong

(57) ABSTRACT

A heating system for heating a fluid received at an inlet, the system including a first heating device disposed in a first heated line branched from the inlet, wherein a first flow of the fluid through the first heated line is configured to be modulated by a first valve; a second heating device disposed in a second heated line branched from the inlet, wherein a second flow of the fluid through the second heated line is configured to be modulated by a second valve; and a bypass line and a third valve disposed in the bypass line, wherein a flow through the bypass line is configured to be modulated by the third valve, wherein the first and second heating devices and the first, second and third valve are configured to cooperate to heat the fluid at an outlet received from the first and second heated line and the bypass line.

1 Claim, 9 Drawing Sheets

(51) Int. Cl.
 *F24F 5/00* (2006.01)
 *F24D 17/02* (2006.01)
(52) U.S. Cl.
 CPC ............ *F24F 5/0021* (2013.01); *F24D 17/02* (2013.01); *F24F 2221/183* (2013.01)

(56) References Cited

U.S. PATENT DOCUMENTS

2016/0320075 A1* 11/2016 Deivasigamani ....... F24D 3/082
2018/0363925 A1* 12/2018 Deivasigamani ......... F24H 9/14

* cited by examiner

HEATING SYSTEM WITH FIRST AND SECOND HEATING DEVICES AND BYPASS LINE

PRIORITY CLAIM AND RELATED APPLICATIONS

This continuation-in-part application claims the benefit of priority from non-provisional application U.S. Ser. No. 16/720,189 filed on Dec. 19, 2019. Said application is incorporated by reference in its entirety.

BACKGROUND OF THE INVENTION

1. The Field of the Invention

The present invention relates to a combined heating and cooling system. More specifically, the present invention is directed to a combined heating and cooling system including a heat pump and a heat storage device.

2. Background Art

Various fossil fuel phase-out initiatives have been made in the heating industry and mandates have been increasingly devised and implemented to phase out the direct or indirect use of fossil fuel in heat production for domestic and/or industrial uses. Attempts have been made to heat domestic water with alternative means, e.g., with the use of heat pumps whose operations are primarily driven using electricity in the form of pump or compressor operations. Supplemental electric heating elements may also be employed to aid a fossil fuel-free domestic water heating system in meeting heating demands. However, existing disparate heating and cooling systems used to service occupants of a building or space often lack the heat transfer synergies that are possible between the devices constituting these systems. For instance, heat generated by a device is released into its surroundings without having been properly harnessed. Unwanted heat from one part of a building is simply rejected into the environment by a first device while a second device that is used for serving the same user as the first device is used to generate heat energy by consuming more natural resources, e.g., fossil fuel, electricity, etc. Further, unused heat energy generated or renewable energy, e.g., solar energy, is not stored for use at a later time. Further, most existing heating systems derive their heat energy from the consumption of a resource to transform energy stored in a non-heat form to heat energy which create by-products in the form of carbon dioxide emissions, etc. The flow of energy between a lower-temperature environment and a higher-temperature environment is not emphasized as the key driver in existing heating or cooling strategies.

There exists a need for heating and/or cooling systems which take advantage of energy flow as the core strategy for heating and cooling, heat energy storage and efficient extraction of heat energy from resources that are simply released into the environment.

SUMMARY OF THE INVENTION

In accordance with the present invention, there is provided a heating system for heating a fluid received at an inlet, the system including:
(a) a first heating device disposed in a first heated line branched from the inlet, wherein a first flow of the fluid through the first heated line is configured to be modulated by a first valve;
(b) a second heating device disposed in a second heated line branched from the inlet, wherein a second flow of the fluid through the second heated line is configured to be modulated by a second valve; and
(c) a bypass line branched from the inlet and a third valve disposed in the bypass line, wherein a flow through the bypass line is configured to be modulated by the third valve,
wherein the first heating device, the first valve, the second heating device, the second valve and the third valve are configured to cooperate to supply heat to the fluid at an outlet received from the first heated line, the second heated line and the bypass line.

In one embodiment, the first heating device includes a coil tube heat exchanger. In one embodiment, the second heating device includes a phase-change material (PCM). In one embodiment, the second heating device includes a heat storage device. In one embodiment, the second heating device includes a water heat storage device. In one embodiment, the second heating device includes a heat storage device configured for thermal coupling with a heat pump. In one embodiment, the heating system further includes a heat pump configured for powering the second heating device.

In accordance with the present invention, there is further provided a heating system for heating a fluid, the heating system including:
(a) a fluid conductor for receiving the fluid at an inlet at a first temperature and supplying the fluid at an outlet at a second temperature that is higher than the first temperature, the fluid conductor including a first heat exchanger configured for receiving heat from a heating flow of a first heat source and a second heat exchanger configured for receiving heat from a second heat source; and
(b) a heat pump including an evaporator disposed within the heating flow and a condenser thermally coupled with the second heat exchanger,
wherein the heating flow is further thermally extracted by the evaporator and transferred via the second heat exchanger to the fluid, reducing the load required of the first heat source to raise the fluid from the first temperature to the second temperature.

In one embodiment, the first heat source includes a gas-fired burner and a blower configured for generating the heating flow. In one embodiment, the first heat source includes a blower configured for generating the heating flow. In one embodiment, the second heat exchanger includes a plate-type heat exchanger. In one embodiment, the first heat exchanger includes a coil.

In accordance with the present invention, there is further provided a heating system including:
(a) a burner;
(b) a blower configured for causing a first fluid flow through the burner from an inlet to an outlet;
(c) a heat exchanger interposed in a path of the first fluid flow, the heat exchanger configured for receiving a second fluid flow at an inlet and exhausting the second fluid flow at an outlet, wherein heat exchange can occur between the first fluid flow and the second fluid flow;
(d) an internal recirculation path connecting the outlet of the second fluid flow with a first point of the inlet of the heat exchanger;
(e) an external recirculation path connecting the outlet of the second fluid flow with a second point of the inlet of the heat exchanger, wherein the second point is disposed downstream of the first point along the second fluid flow; and (f) a pump disposed at a third point of the inlet of the heat exchanger, wherein the third point is disposed downstream of the second point along the second fluid flow, wherein the temperature of the second fluid flow is increased by at least one of the following operating modes of the heating system: (i) the pump is turned on to circulate the second fluid flow through at least one of the internal recirculation path and the external recirculation path, the blower is turned on to cause the first fluid flow which causes heat transfer from the first fluid flow via the heat exchanger to the second fluid flow; and (ii) the pump is turned on to circulate the second fluid flow through at least one of the internal recirculation path and the external recirculation path, the blower is turned on to cause the first fluid flow which causes heat transfer from the first fluid flow via the heat exchanger to the second fluid flow; and the burner is turned on to cause heat transfer from the burner via the heat exchanger to the second fluid flow.

In one embodiment, the heating system further includes a space heating and space conditioning system comprising a heat pump interposed between the first point and the second point along the second fluid flow, wherein the heat pump is configured to supply heat to the second fluid flow in a space cooling mode of the heat pump and to draw heat from the second fluid flow in a space heating mode of the heat pump. In one embodiment, the heating system further includes a valve interposed within the internal recirculation path for controlling the size of the second fluid flow through the internal recirculation path. In one embodiment, the heating system further includes a valve interposed within the external recirculation path for controlling the size of the second fluid flow through the external recirculation path. In one embodiment, the heating system further includes a check valve interposed within the internal recirculation path for preventing a bypass flow through the internal recirculation path to the external recirculation path. In one embodiment, the heating system further includes a heat storage tank interposed between the first point and the second point, wherein the heat storage tank is configured to store heat communicated from the second fluid flow. In one embodiment, the heating system further includes a solar collector functionally coupled to the heat storage tank.

An object of the present invention is to provide a means for capturing waste heat for use in water heating.

Another object of the present invention is to provide a means for capturing waste heat for use in water heating with minimal hardware.

Another object of the present invention is to provide a means for removing heat from a space, storing the captured heat and releasing the heat for use either for space heating and/or water heating or for other heating purposes.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
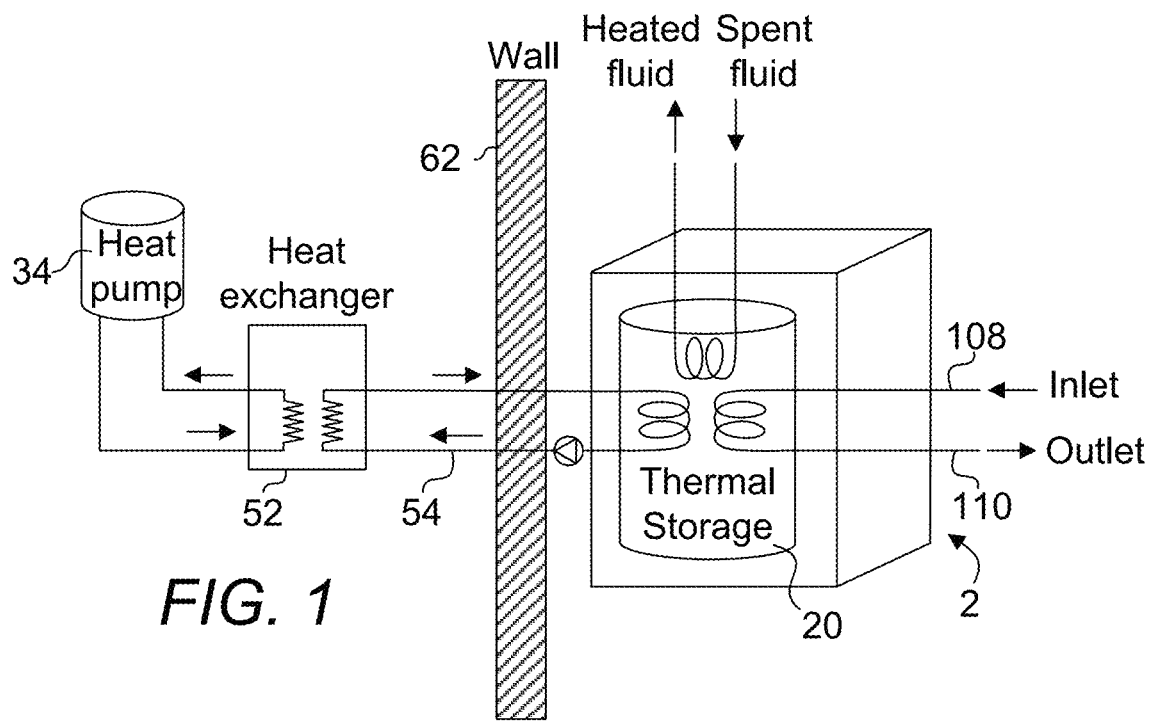
FIG. 1 is a diagram depicting a heat storage device which harnesses energy from an outdoor environment and stores it within a building.

2—heating storage device
4—heating system
6—compressor
8—heat exchanger
10—pump
12—valve
14—heated line
16—heated line
18—bypass line
20—heat storage tank
22—heat exchanger
24—inlet
26—outlet
28—temperature sensor
30—inlet flow
32—outlet flow
34—heat pump
36—flue-to-refrigerant heat exchanger, e.g., an evaporator
38—refrigerant-to-water heat exchanger
40—exhaust
42—blower
44—fluid conductor
46—heat exchanger 48—housing
50—condensate drainage hole
52—heat exchanger
54—fluid conductor containing a heat transfer fluid
56—valve
58—valve
60—controller
62—building
64—expansion valve
66—condenser and fan unit
68—burner
70—pump
72—heat exchanger
74—temperature regulator
76—pump
78—heat storage tank
80—flow line
82—valve
84—valve
86—solar collector
88—point of use, e.g., shower
90—heat pump
92—heat exchanger
94—compressor
96—expansion valve
98—heat exchanger
100—internal recirculation path
102—external recirculation path
104—air inlet
106—air outlet
108—inlet
110—outlet
112—condenser

PARTICULAR ADVANTAGES OF THE INVENTION

The present heating system reduces the dependence of fossil fuel or electric heat or heat generated as a result of the consumption of a substance. Rather, the present heating system facilitates the flow or harnessing of existing heat energy via one or more heat pumps, i.e., causing a transfer of heat energy from a location where the heat energy is not required to a location where the heat energy can be used to increase the comfort of the user at the latter location. In one embodiment, a renewable energy, i.e., solar energy, is harnessed directly and either stored or consumed as it is being harnessed.

In one embodiment, the present heating system reduces the dependence of fossil fuel or electric heat or heat generated as a result of the consumption of a substance and/or electricity by causing a transfer of heat energy that would otherwise be wasted at the exhaust of a gas-fired burner to the inlet of a water supply to be heated.

In one embodiment, the present heating system is capable of removing heat from a space for lowering the temperature of the space for comfort and using at least a portion of the removed heat to be stored in a thermal storage device or to heat water and/or another heating purposes, reducing the total energy expended for cooling and/or heating.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower). In some cases in the ensuing description, for the sake of simplicity and clarity, no controllers are shown functionally attached to various components, e.g., pumps, valves, compressors, etc., contributing to the mission of heating or cooling of a space or venue. However, the use of such controllers is inherently required for these components to function as systems and are a commonplace in modern control technologies and requires no further elaboration.

FIG. 1 is a diagram depicting a heat storage device which harnesses energy from an outdoor environment and stores it within a building. The heat storage device 2 includes a thermal storage tank which stores a substance, e.g., water or a phase change material (PCM) and a heat pump thermally coupled with it at heat exchanger 52 outside of a building that houses a heat storage tank 20. Heat exchanger 52 is thermally coupled with heat storage tank 20 via a fluid flow of fluid conductor 54. The heat stored in the heat storage tank 20 may be retrieved by a domestic water heating system and/or a space heating system or another heating system through a heat exchanger, e.g., a coil, disposed within the thermal storage substance stored in the heat storage tank 20. For instance, a water supply received at inlet 108 is configured to receive stored heat from tank 20 in order to supply a heated water supply at outlet 110. Similarly, another device requiring heat may be thermally coupled with the tank 20.

Figure 2:
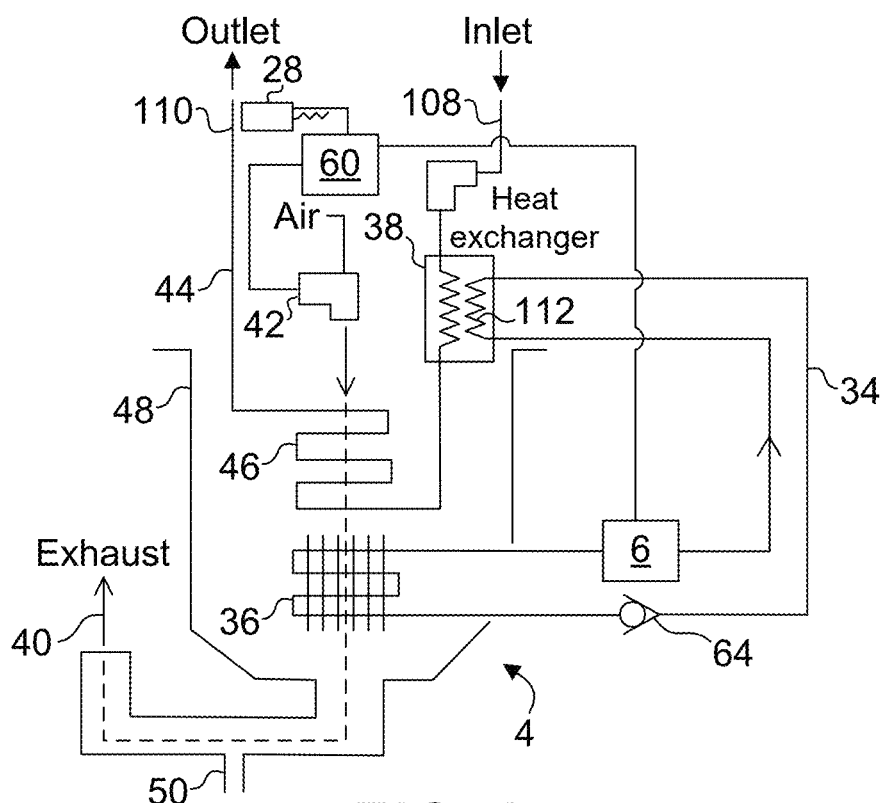
FIG. 2 is a diagram depicting a high efficiency heating system capable of recovering waste heat.

FIG. 2 is a diagram depicting a high efficiency heating system 4 capable of recovering waste heat. The heating system includes a blower 42, a fluid conductor 44, a heat pump 34 and a heat source that, in the embodiment shown, is generated by an air flow drawn into the heating system by the blower 42. The fluid conductor 44 receives a fluid, e.g., domestic water, at an inlet at a first temperature and supplying the fluid at an outlet at a second temperature that is higher than the first temperature. The fluid conductor 44 includes a first heat exchanger 46 configured for receiving heat from the flow generated by the blower 42 and a second heat exchanger 38 configured for receiving heat from a second heat source. The heat pump 34 includes, an expansion valve 64, an evaporator 36 disposed within the air flow and downstream of the expansion valve 64 of the heat pump 34 and a condenser 112 thermally coupled with the second heat exchanger 38. The air flow is further thermally extracted by the evaporator 36 and transferred via the second heat exchanger 38 to the fluid, reducing the load required of the heating system to raise the fluid from the first temperature to the second temperature. In one embodiment not shown, a heat pump similar to heat pump 34 may be configured to recover heat from waste water effluent from points of use, e.g., sinks, showers, etc. For instance, a tremendous amount of heat energy is left unharnessed from waste water due to hot showers or baths and the waste water is simply drained into sewer and septic systems, carrying left over heat energy with it.

Figure 3:
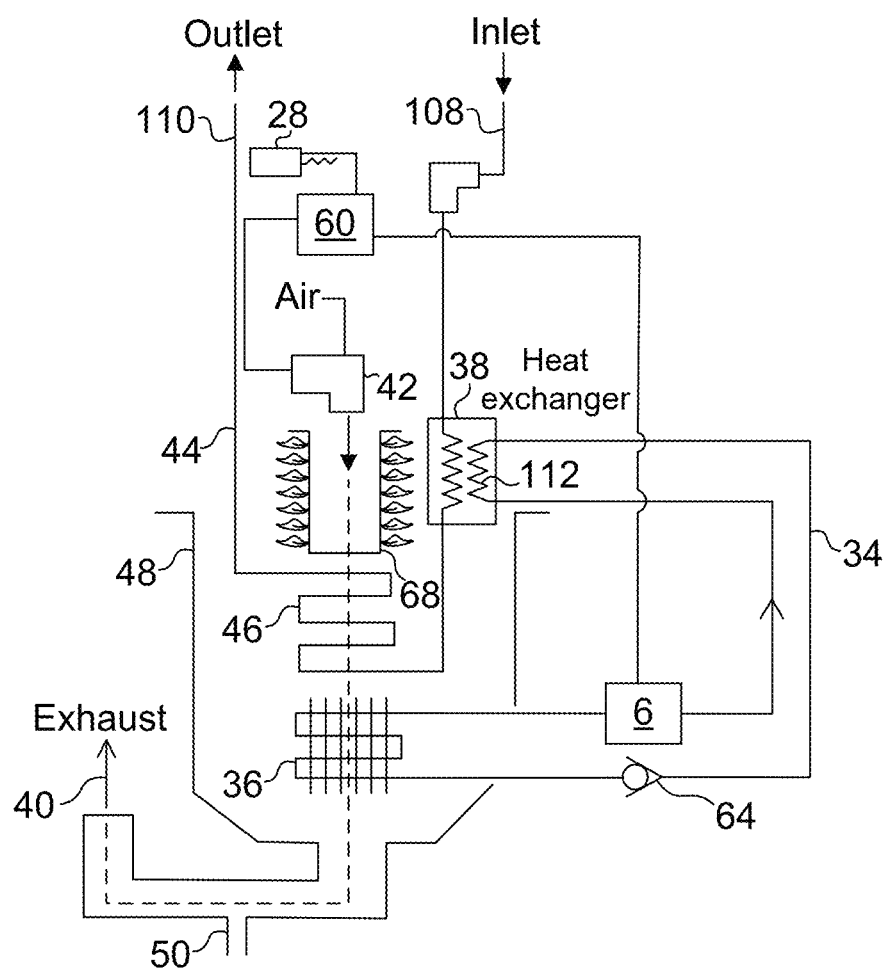
FIG. 3 is a diagram depicting a high efficiency heating system capable of recovering waste heat.
Figure 4:
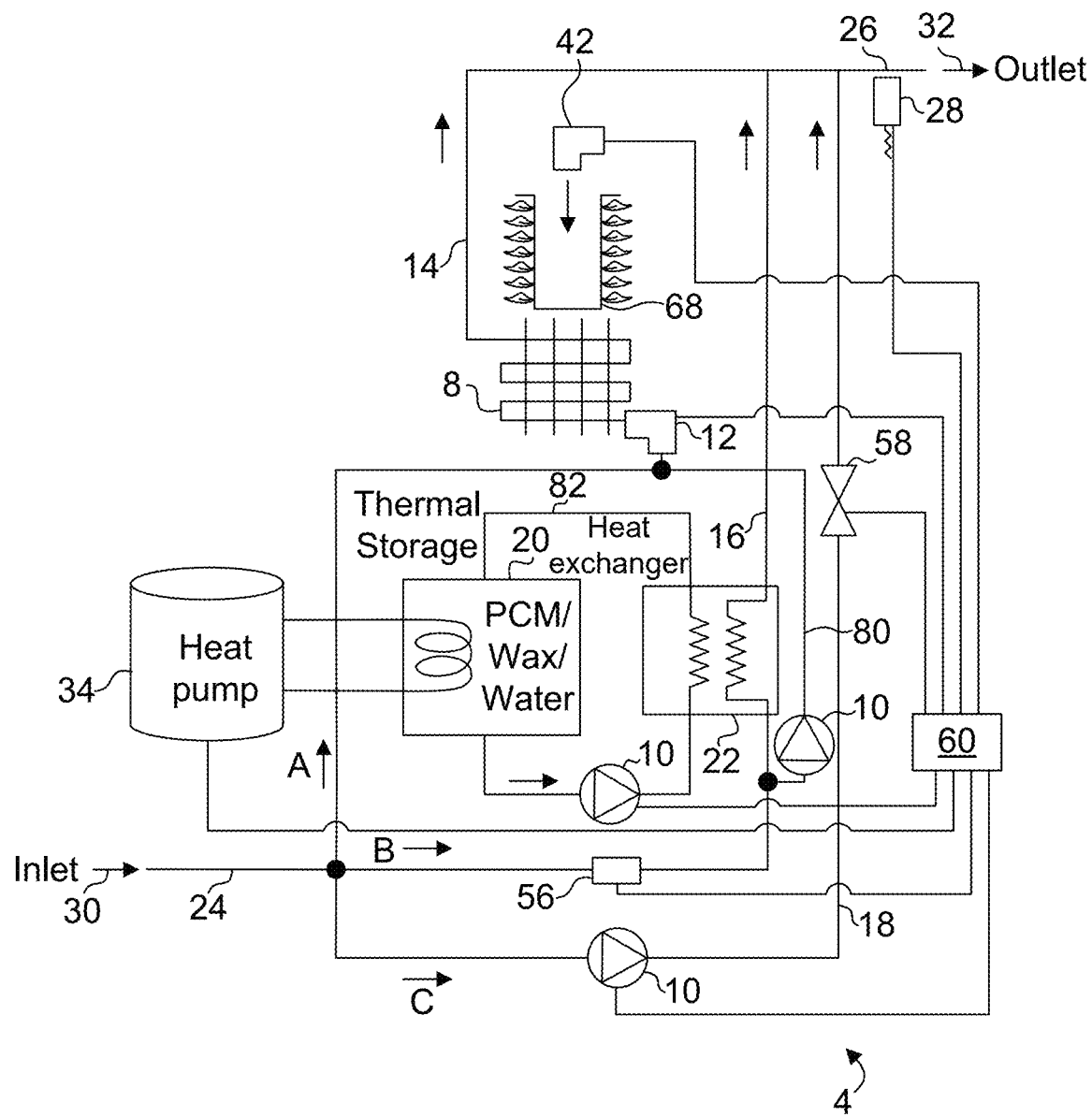
FIG. 4 is a diagram depicting a heating and air conditioning system aided with an energy storage device.

FIG. 3 is a diagram depicting a high efficiency heating system capable of recovering waste heat. The heating system shown in FIG. 3 is similar to the system of FIG. 2 with an exception that the heating system of FIG. 3 includes a burner 68 interposed in the air flow generated by blower 42. Here, the main heat source is a burner 68, e.g., a gas-fired burner operationally coupled with a blower 42. Therefore, the flow that is forced through the housing is a flue flow when the burner 68 is turned on. The flow remains an air flow if the burner 68 is kept off. It shall be noted that as the air flow moved by blower 42 arrives at evaporator 36 that is disposed in a housing 48, it is still disposed at a temperature higher than the temperature of the refrigerant flow in the heat pump 34, the refrigerant is capable of receiving the heat conducted from the flue flow and as the refrigerant is compressed by compressor 6, the temperature of the refrigerant is raised further until it passes a condenser thermally coupled to the heat exchanger 38 where heat transfer occurs and a portion of its heat is transferred to the incoming fluid flow in the fluid conductor 44, thereby pre-heating the incoming flow, reducing the load of the heat source required to bring the temperature of the fluid flow in the fluid conductor 44 to a desired temperature. In one embodiment, the second heat exchanger 38 includes a plate-type heat exchanger. In one embodiment, the first heat exchanger 46 includes a coil. A temperature sensor 28 is configured to report the temperature of the fluid at the outlet of the system, i.e., the outlet of the fluid conductor 44, to a controller 60 and if the heat source is determined to be incapable of causing the fluid to be output at a desired temperature, the firing rate of the heat source 42 is increased. Further, the flowrate of the refrigerant of the heat pump 34 may also be adjusted based on the requirement in heat recovery from the flue flow generated by the heat source. The rate of heat recovery can be increased by increasing the speed of the compressor 6 and this increase can be coupled with an increase in the intensity of the heat source as well, e.g., blower speed, firing rate of the burner, etc. It shall be noted that, upon passing the evaporator 36, the flue flow in the case of FIG. 3 or the air flow in the case of FIG. 2, exits the heating system as exhaust 40. Any condensate generated of the system is drained via the condensate drainage hole 50. When the burner 68 is used, the generated flue flow is further thermally extracted by the evaporator 36 and transferred via the second heat exchanger 38 to the fluid, again reducing the load required of the heating system to raise the fluid from the first temperature to the second temperature. FIG. 4 is a diagram depicting a heating and air conditioning system aided with an energy storage device where the system receives a fluid to be heated at an inlet 24 and outputs a heated flow of the fluid at an outlet 26. The system includes a first heating device, a second heating device and a bypass line 18. The first heating device is disposed in a first heated line 14 branched from the inlet which receives an inlet flow 30, where a first flow of the fluid through the first heated line 14 is configured to be modulated by a first valve 12. The second heating device is disposed in a second heated line 16 branched from the inlet, where a second flow of the fluid through the second heated line 16 is configured to be modulated by a second valve 56. The bypass line 18, also branched from the inlet, includes a third valve 58 disposed in the bypass line 18, where a flow through the bypass line 18 is configured to be modulated by the third valve 58. The first heating device, the first valve 12, the second heating device, the second valve 56 and the third valve 58 are configured to cooperate to supply heat to the fluid at an outlet received from the first heated line 14, the second heated line 16 and the bypass line 18. A temperature sensor 28 disposed at the outlet 26 of the system indicates the temperature of the outlet flow 32. In the embodiment shown, the first heating device includes a coil tube heat exchanger 8 thermally coupled with a burner 68 that is operationally coupled to a blower 42. In the embodiment shown, the second heating device includes a heat storage device 20, e.g., a heat storage tank. The heat storage device is configured for thermal coupling with a heat pump 34 and for receiving heat energy via the heat pump 34 for storage in the heat storage device. Heated line 16 is configured to receive heat via a heat exchanger 22 interposed in the line 16.

A demand that can no longer be kept up is indicated by the temperature sensor 28 as a flow that continues to decrease in its temperature over a period of time. In one embodiment, the ability of keeping up with the demand can also be determined and calculated using the thermal energy stored in the tank 20 and the thermal transfer rate at heat exchanger 22 and the size of demand at outlet 26. As the amount of energy stored in tank 20 is determined to be incapable of meeting the demand at outlet 26 at a desired setpoint temperature, the flow through line 14 is increased and the flowrate through bypass line 18 is decreased to cause more flowrate through line 14. Alternatively, the heat output rate of heat source associated with the blower 42 can be increased to provide a higher heating rate to maintain the flow output temperature at outlet 26. Alternatively, the flow through line 16 may also be adjusted down so that the flowrate through line 14 is increased if the thermal reserve of the heat storage tank 20 is nearly depleted. In supplying heated water at outlet 26, burner 68 is not required to be turned on at all times. As long as the air drawn by blower 42 is disposed at a temperature higher than the temperature of the flow in heat exchanger 8, heat energy can be readily transferred to the flow in heat exchanger 8. Further, residual heat in heat exchanger 8 can be captured in the heat storage device 20 even upon cessation of both blower 42 and burner 68 if flow line 80 and a pump 10 disposed therein is provided. Here, upon cessation of a demand at outlet 26 and if pump 10 of line 80 is turned on, a recirculating flow can be maintained through line 80 in the direction of the pump flow, through the once heated heat exchanger 8 which causes residual heat at heat exchanger 8 to be extracted into the flow within line 14 and subsequently through heat exchanger 22 of line 16 before recirculating through line 80. In heat exchanger 22, the residual heat harnessed earlier essentially flows from the flow in line 16 into the flow in line 82 where it is eventually stored in heat storage tank 20. In one example, when a demand starts, the demand will be first met by the second heated line 16 until the demand can no longer be met by the second heated line 16 alone, i.e., with only heat energy transferred via heat exchanger 22 to the flow in the second heated line 16, at which time the first heated line 14 is used to supply an additional heated flow with the heat source 42 turned on by the controller 60 to supplement heating that supplies sufficient hot water at the outlet 26. However, if the desired fluid temperature, as indicated by temperature sensor 28, is too high, the bypass line 18 which carries unheated water, can be controlled via valve 58 by the controller 60 to supply unheated water to temper the excessively hot water.

Figure 5:
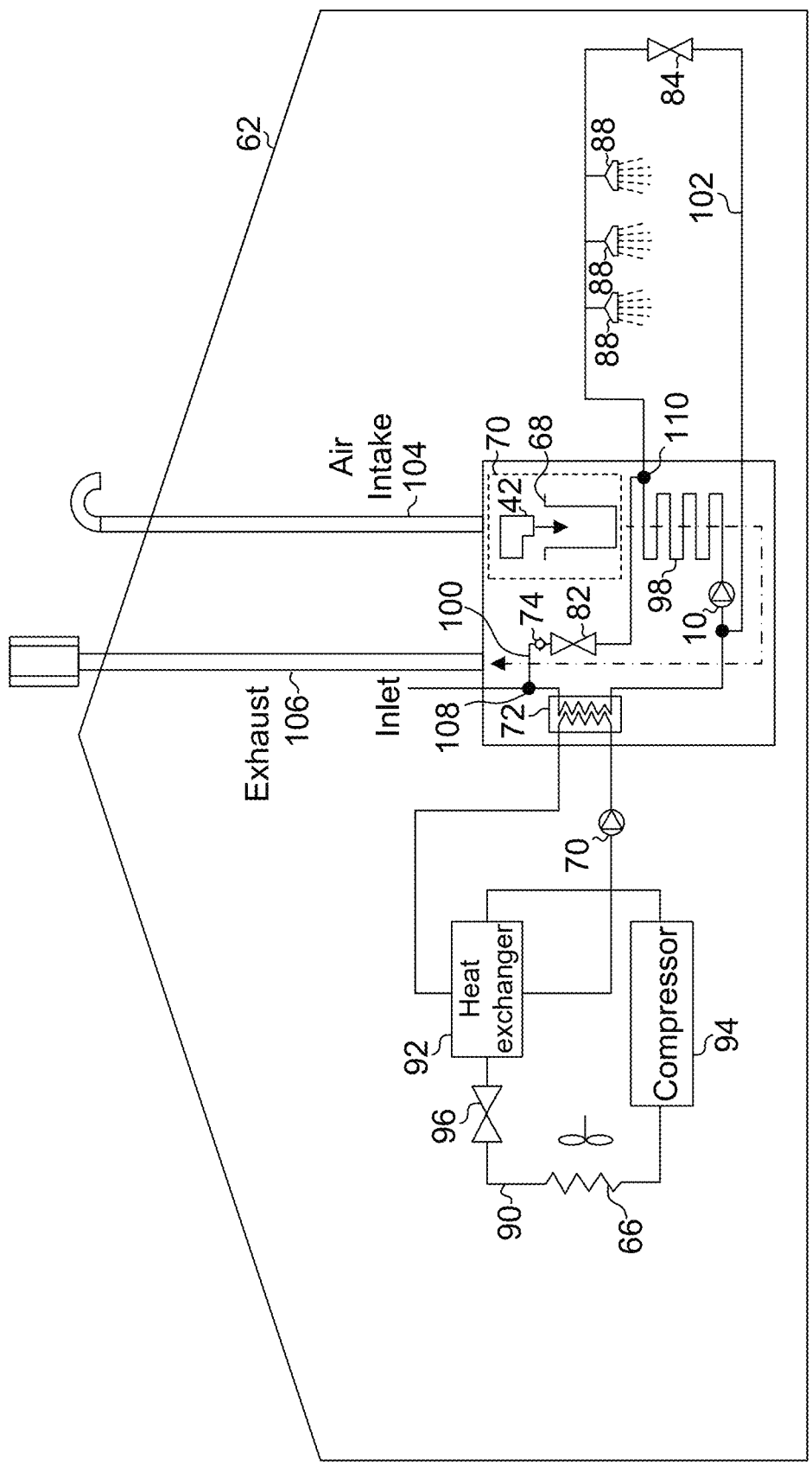
FIG. 5 is a diagram depicting a space and water heating and air conditioning system aided with stored energy in fluid conductors.

FIG. 5 is a diagram depicting a space and water heating and air conditioning system aided with stored energy in fluid conductors already configured to prepare and deliver hot water to users at points of use, removing a need for an additional or dedicated heat storage device. The fluid conductors are preferably insulated to reduce loss of heat energy along the lengths of the fluid conductors. The heating system includes a burner 68, a blower 42, a heat exchanger 98, an internal recirculation path 100, an external recirculation path 102 and a pump 10. The blower 42 is configured for causing a first fluid flow, e.g., air flow, through the burner 68 from an inlet to an outlet. The heat exchanger 98 is interposed in a path of the first fluid flow, the heat exchanger 98 configured for receiving a second fluid flow, e.g., water flow, at an inlet 108 and exhausting the second fluid flow at an outlet 110, wherein heat exchange can occur between the first fluid flow and the second fluid flow. The internal recirculation path 100 connects the outlet of the second fluid flow with a first point of the inlet of the heat exchanger 98. The external recirculation path 102 connects the outlet of the second fluid flow with a second point of the inlet of the heat exchanger 98, where the second point is disposed downstream of the first point along the second fluid flow. The pump 10 is disposed at a third point of the inlet of the heat exchanger 98 wherein the third point is disposed downstream of the second point along the second fluid flow.

The temperature of the second fluid flow is increased by at least one of the following operating modes of the heating and air conditioning system: (i) the pump 10 is turned on to circulate the second fluid flow through at least one of the internal recirculation path 100 and the external recirculation path 102, the blower is turned on to cause the first fluid flow which causes heat transfer from the first fluid flow via the heat exchanger 98 to the second fluid flow; and (ii) the pump 10 is turned on to circulate the second fluid flow through at least one of the internal recirculation path 100 and the external recirculation path 102, the blower 42 is turned on to cause the first fluid flow which causes heat transfer from the first fluid flow via the heat exchanger 98 to the second fluid flow; and the burner 68 is turned on to cause heat transfer from the burner 68 via the heat exchanger 98 to the second fluid flow. It shall be noted that the blower 42 may be turned on independently of the burner 68. As an air flow is drawn through air inlet 104 by blower 42, it flows through a path burner 68 is disposed and eventually to an outlet 106. The water flow can be heated independently of a heat pump 90. However, with a heat pump 90 interposed between the first point and the second point along the water flow, the heat pump 90 can be used to supply heat to the water flow in a space cooling mode of the heat pump and to draw heat from the water flow in a space heating mode of the heat pump. A valve 82 is interposed within the internal recirculation path for controlling the size of the water flow through the internal recirculation path. A valve 84 is interposed within the external recirculation path for controlling the size of the water flow through the external recirculation path. A check valve 74 disposed within the internal recirculation path prevents a bypass from flowing through the internal recirculation path 100 to the external recirculation path 102. The heat pump 90 is thermally coupled to the water flow via a heat exchanger 72. The heat pump 90 includes a compressor 94, a condenser and fan unit 66 and an expansion valve 96. A heat exchanger 92 is thermally coupled to the heat pump 90. Heat exchanger 92 is in turn thermally coupled to heat exchanger 72. It shall be noted that as long as a water flow can be established in any one of the water conductors, external heat energy may be stored in the water flow. For instance, with the burner 68 remains off, as long as a flow is established in the internal recirculation path 100 along with an air flow caused by the blower 42 and the temperature of the air flow drawn from outside of the building 62 through air inlet conductor 104 that is higher than the water flow temperature in the heat exchanger 98, heat transfer will occur from the air flow to the water flow in the internal recirculation path 100. Upon traversing the heat exchanger 98, the air flow continues to exit the building 62 through air outlet conductor 106. Water flow in the external recirculation path 102 may be heated in a similar manner. Internal and external recirculation can occur simultaneously to afford a larger water volume for heat storage although each can be selected individually by opening valve 82 and 84, respectively. Each of valves 82, 84 can be an on-off or a modulating valve. Pump 10 is only turned on if at least a hot water demand exists at a point of use 88 or at least one of the two valves 82, 84 is at least partially open or the heating system will be dead-headed. If a hot water demand exists and the temperature of the water flow is deemed insufficiently high at any one of the points of use 88 to meet the temperature setpoint, e.g., 120 degrees F., then the burner 68 may be turned on to rapidly add heat to the system via the flue gas generated as a result of combustion of burner 68 and radiation from the burner 68. As the water or water flow/s contained in the fluid conductors has already been partially heated, the burner load required to increase the temperature at points of use 88 will be lower, thereby reducing the amount of energy expended at the burner 68 which is typically configured to consume a fossil fuel, e.g., natural gas, propane, gasoline, etc.

In some regions, the heating system shown in FIG. 5 may not even include a burner as the average outdoor temperature is high enough especially during winter months such that heating using outdoor air alone is sufficient in getting the water temperature to a comfortable level. The air flow path of the burner is essentially the same path as the air path, i.e., the burner 68 uses the same incoming air drawn in through inlet 104 and the flue gas generated by the burner 68 exits the building 62 via the outlet 106. With the addition of a heat pump 90, a space heating and air conditioning system can be added. For the heat pump 90 to function as a space heating system, the compressor 94 is configured to drive a refrigerant flow or another working fluid flow in the direction towards the condenser and fan unit 66. Having received heat via heat exchanger 92, the refrigerant flow that is now compressed upon leaving compressor 94 is now elevated in temperature and heat is rejected at condenser and fan unit 66 to the space or air flow being heated. For the heat pump 90 to function as a space conditioning system, the compressor 94 is configured to drive the refrigerant flow in the direction towards the heat exchanger 92. Upon leaving the compressor 94, the temperature of the refrigerant flow becomes elevated such that heat flow occurs from the heat pump 90 by way of heat exchangers 92, 72 to the water heating system as long as pump 70 is activated. Upon rejecting heat at heat exchanger 92, the temperature of the refrigerant flow continues to drop upon passing the expansion valve 96. Upon arriving at the condenser and fan unit 66, the refrigerant flow is now disposed at a temperature lower than the temperature of the air used in cooling the space. Heat transfer occurs from the air moved by the fan of the condenser and fan unit 66, cooling the space and providing the water heating system with additional heat.

Figure 6:
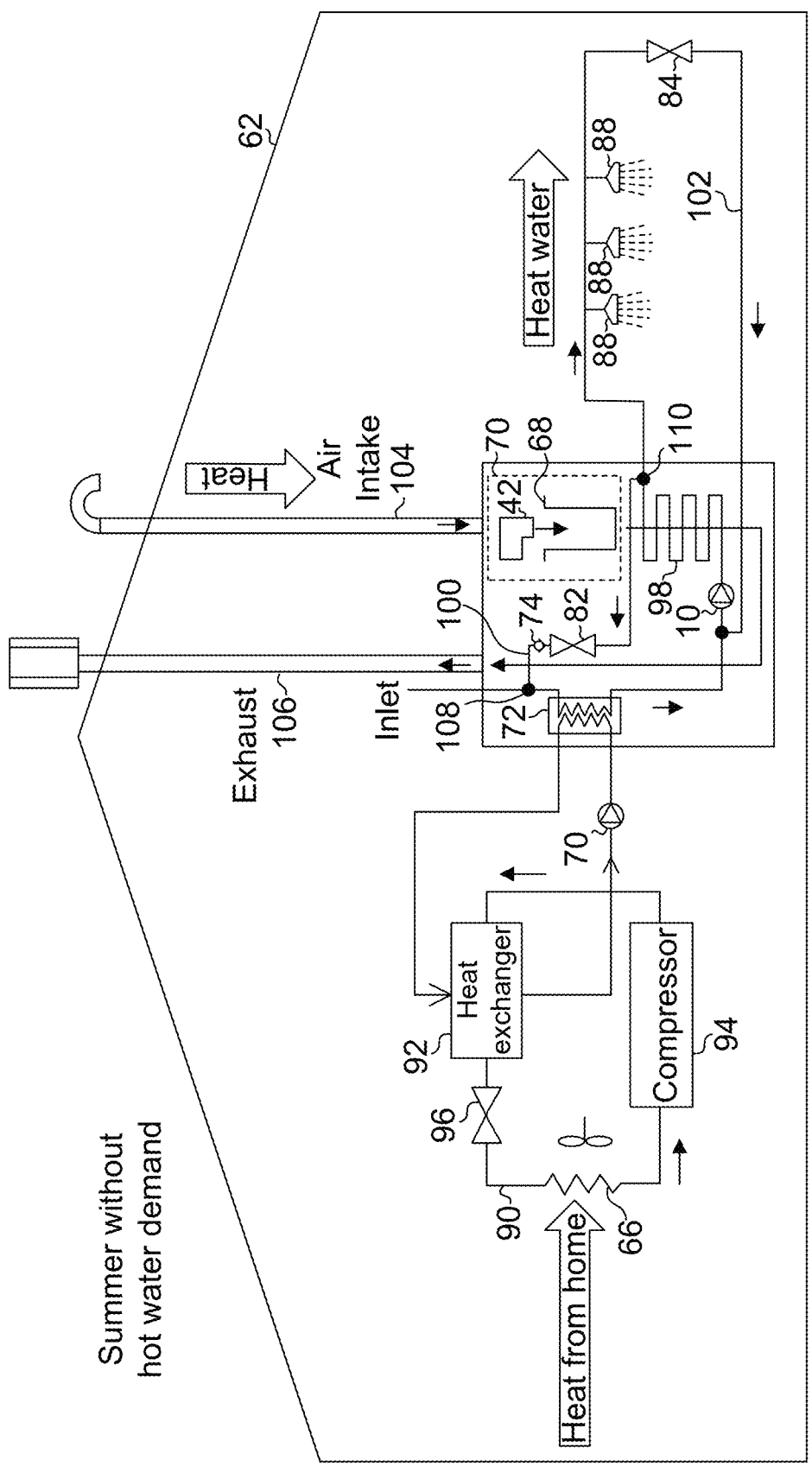
FIG. 6 is a diagram depicting a space and water heating and air conditioning system aided with stored energy in fluid conductors and its operation during summer without a hot water demand.
Figure 7:
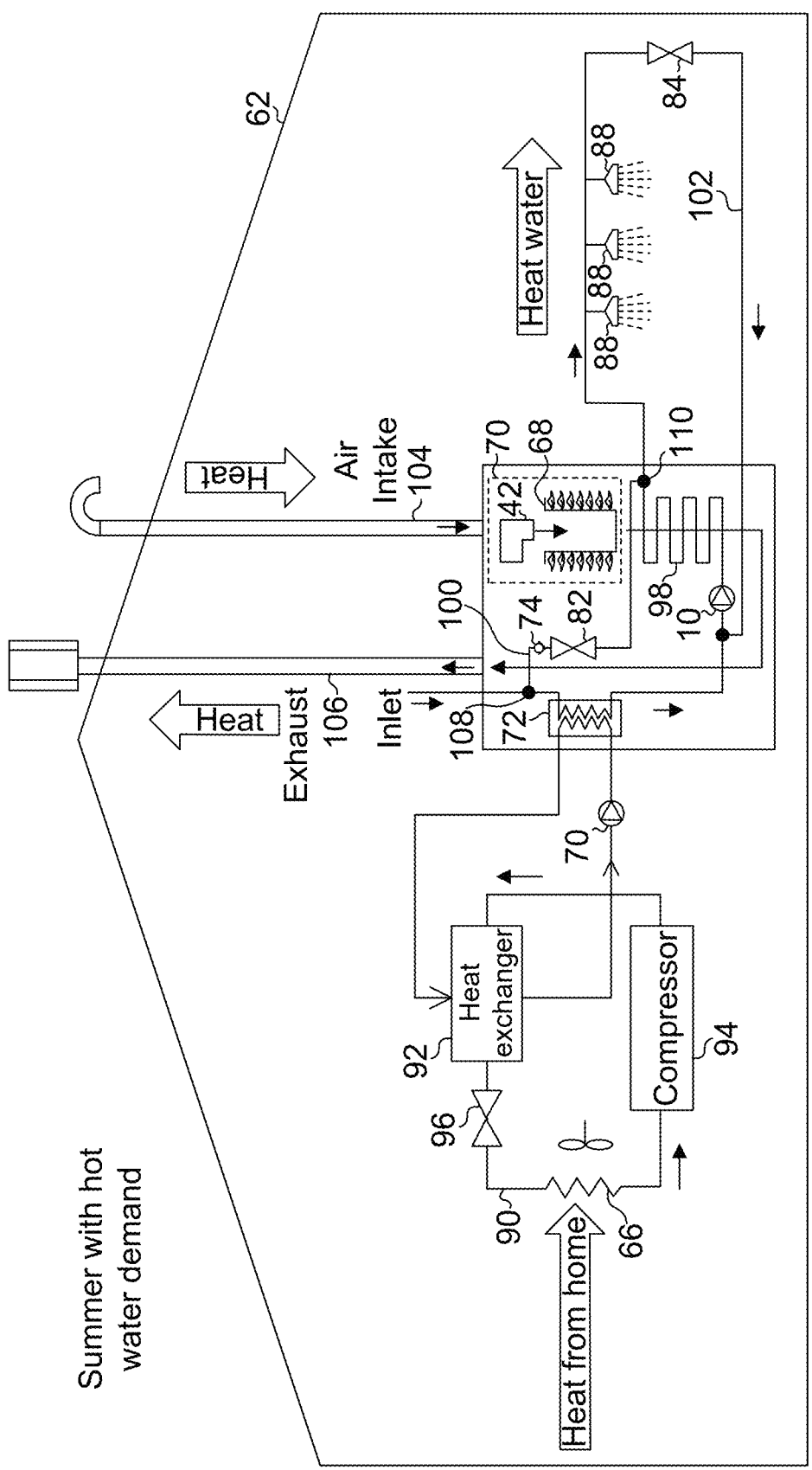
FIG. 7 is a diagram depicting a space and water heating and air conditioning system aided with stored energy in fluid conductors and its operation during summer with a hot water demand.

FIG. 6 is a diagram depicting a space and water heating and air conditioning system aided with stored energy in fluid conductors and its operation during summer without a hot water demand. Note the direction in which the compressor 94 operates by noting the arrows representing the refrigerant flow. Note also that the burner 68 is not turned on without a demand. FIG. 7 is a diagram depicting a space and water heating and air conditioning system aided with stored energy in fluid conductors and its operation during summer with a hot water demand. Here, it shall be noted that the burner 68 is now turned on to meet a hot water demand as the size of the demand is too large to be met by the heated water stored in the water flow conductors.

Figure 8:
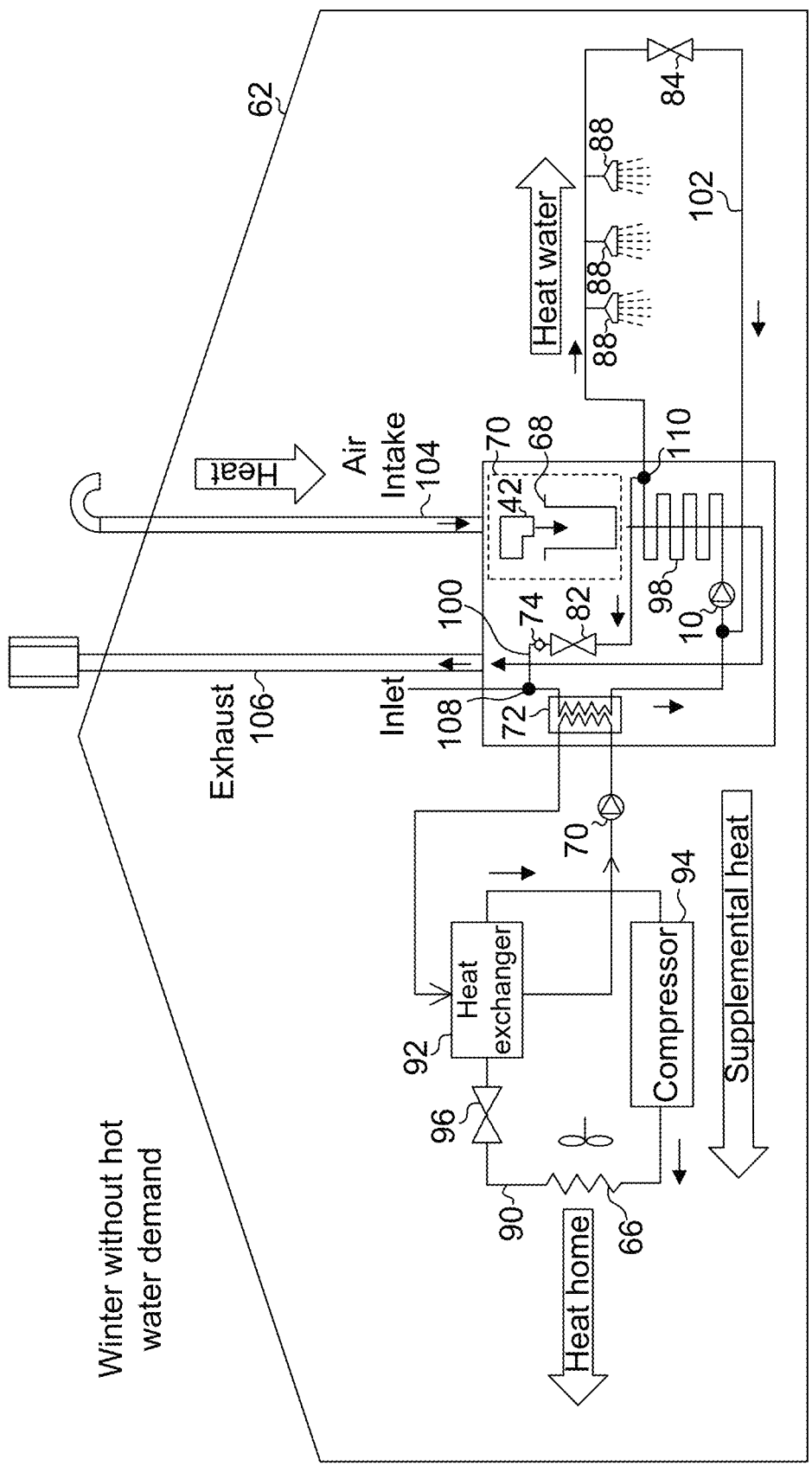
FIG. 8 is a diagram depicting a space and water heating and air conditioning system aided with stored energy in fluid conductors and its operation during winter without a hot water demand.
Figure 9:
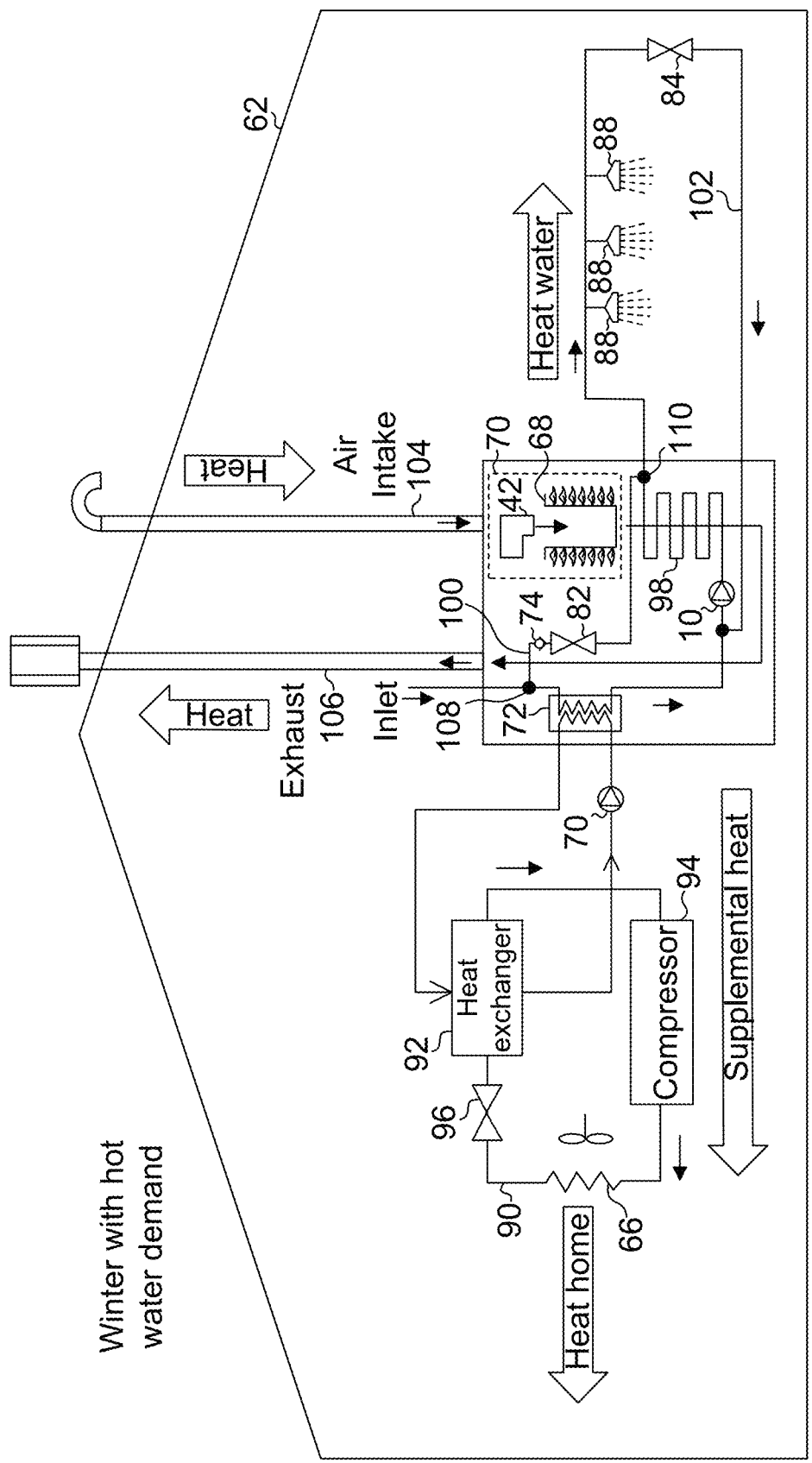
FIG. 9 is a diagram depicting a space and water heating and air conditioning system aided with stored energy in fluid conductors and its operation during winter with a hot water demand.

FIG. 8 is a diagram depicting a space and water heating and air conditioning system aided with stored energy in fluid conductors and its operation during winter without a hot water demand. Again, note the direction in which the compressor 94 operates by noting the arrows representing the refrigerant flow, a direction that is opposite of the direction shown in FIG. 7. Again, note also that the burner 68 is not turned on without a demand. FIG. 9 is a diagram depicting a space and water heating and air conditioning system aided with stored energy in fluid conductors and its operation during winter with a hot water demand. Here, it shall be noted that the burner 68 is now turned on to meet a hot water demand as the size of the demand is too large to be met by the heated water stored in the water flow conductors.

Figure 10:
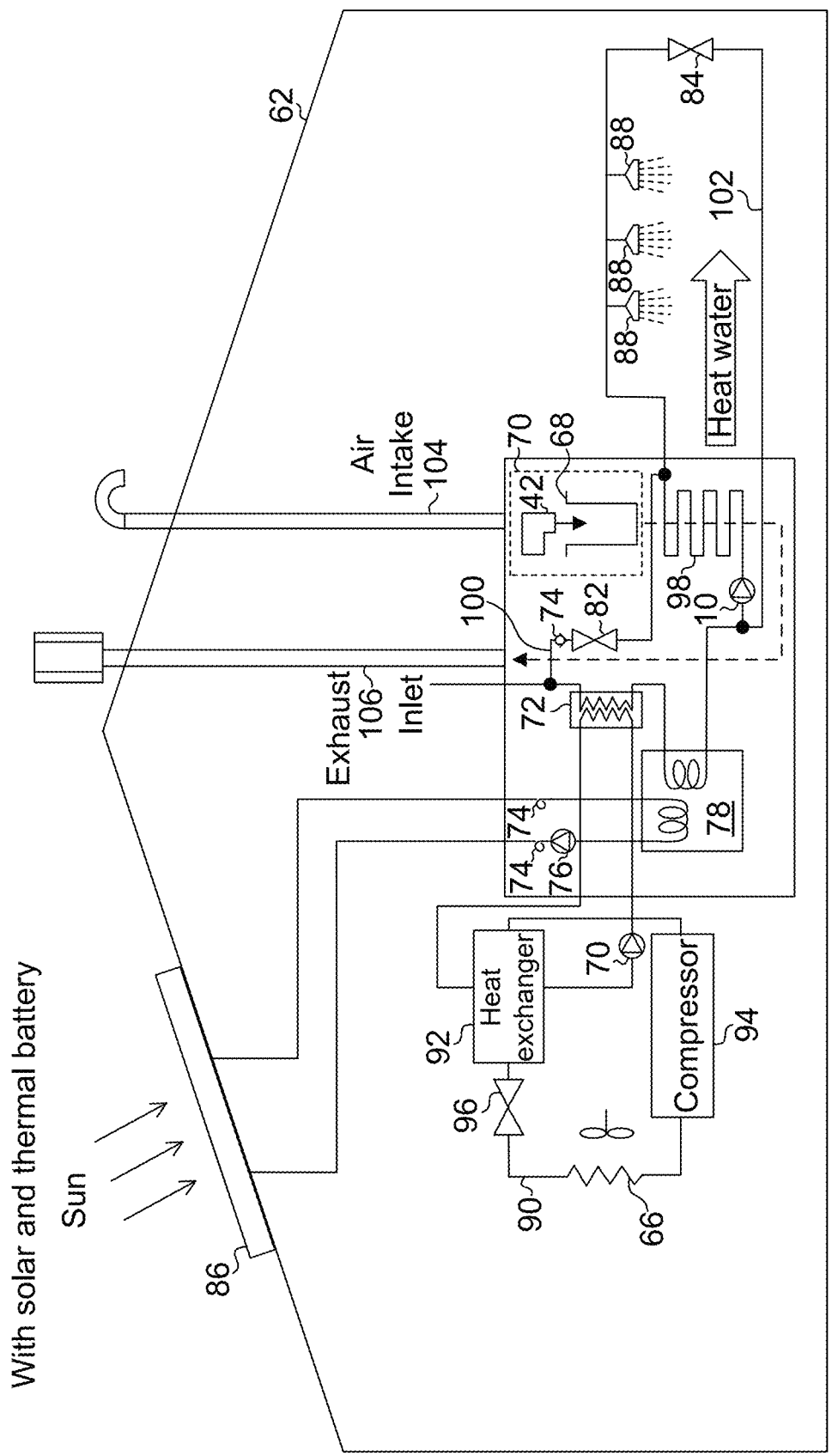
FIG. 10 is a diagram depicting a space and water heating and air conditioning system aided with stored energy in fluid conductors and an additional heat storage device.

FIG. 10 is a diagram depicting a space and water heating and air conditioning system aided with stored energy in fluid conductors and an additional heat storage device. It shall be noted that in this embodiment, the heating system further includes a heat storage tank 78 interposed between the first point and the second point, where the heat storage tank 78 is configured to store heat communicated from the water flow. The heating system further includes a solar collector 86 functionally coupled to the heat storage tank 78 in a loop. The solar collector 86 is essentially a device that collects and/or concentrates solar radiation from the sun to heat a fluid flow moved by a pump 76 within the loop. Two temperature regulators 74 each disposed on an inlet and outlet, respectively, of the solar collector 86 is used to prevent loss of thermal energy stored in the heat storage tank 78 through the solar collector 86 when the solar collector 86 is not being used, e.g., during periods when there is insufficient sun light as thermal energy is trapped in the artificial highest point of the fluid conductor (as provided by each temperature regulator 74) connected to either the inlet or outlet of the solar collector 86. In one embodiment, each temperature regulator 74 is a loop. It shall be understood that the heat energy harnessed by the solar collector 86 may be alternatively stored directly in the fluid conductors, i.e., in place of the heat storage tank 78. In that case, a heat exchanger is used where heat is communicated between the water flow and solar collector 86 loop directly instead of the indirect transfer of heat through the medium or contents of the heat storage tank 78, e.g., water, which serves as a heat storage medium.

Any thermal or heat storage devices disclosed herein that are not configured to also supply potable water can include any one of following substances for retaining and releasing heat stored therein, e.g., a phase-change material (PCM), e.g., paraffin wax, etc., liquid, e.g., water, etc., and any substances having high heat of fusion, high thermal conductivity, high specific heat and density.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A heating system for heating a fluid received at an inlet, the system comprising:
   (a) a first heating device disposed in a first heated line branched from the inlet, wherein a first flow of the fluid through the first heated line is configured to be modulated by a first valve;
   (b) a second heating device disposed in a second heated line branched from the inlet, wherein a second flow of the fluid through the second heated line is configured to be modulated by a second valve; and
   (c) a bypass line and a third valve disposed in the bypass line branched from the inlet, wherein a third flow through the bypass line is configured to be modulated by said third valve,
wherein the first heating device comprises a burner and a coil-tube heat exchanger, the coil-tube heat exchanger is disposed in a forced-air path driven by a blower, the fluid is configured to be heated by forced-air of the forced-air path through the coil-tube heat exchanger and optionally heated by the burner,
   wherein the second heating device comprises a thermal storage tank including a heat storage substance selected from water or a phase-change material (PCM), the thermal storage tank thermally coupled to a heat pump such that, in a space-cooling mode of the heat pump, heat removed from a conditioned space is stored in the thermal storage tank for later delivery to the fluid via the second heated line, and
   wherein a controller is configured to cooperatively modulate the first, second, and third valves based on an outlet-temperature setpoint of the fluid so that the temperature of the fluid received at an inlet is modified by selectively mixing flows from the first heated line, the second heated line, and the bypass line.

* * * * *